(12) United States Patent
Oh et al.

(10) Patent No.: US 10,656,018 B2
(45) Date of Patent: May 19, 2020

(54) METHOD FOR DETECTING SHIPWRECKED VESSEL AND DROWN VICTIMS BY USING AERIAL HYPERSPECTRAL IMAGE

(71) Applicant: KOREA INSTITUTE OF OCEAN SCIENCE & TECHNOLOGY, Busan (KR)

(72) Inventors: Sangwoo Oh, Sejong-si (KR);
Tae-Sung Kim, Daejeon (KR);
Won-Soo Kang, Sejong-si (KR);
Moonjin Lee, Daejeon (KR);
Tae-Byung Chun, Daejeon (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 0 days.

(21) Appl. No.: 16/465,079

(22) PCT Filed: May 18, 2018

(86) PCT No.: PCT/KR2018/005719
§ 371 (c)(1),
(2) Date: May 29, 2019

(87) PCT Pub. No.: WO2019/083109
PCT Pub. Date: May 2, 2019

(65) Prior Publication Data
US 2019/0293489 A1    Sep. 26, 2019

(30) Foreign Application Priority Data
Oct. 24, 2017    (KR) .................. 10-2017-0138392

(51) Int. Cl.
*G01J 3/28* (2006.01)
*G01J 3/42* (2006.01)
(Continued)

(52) U.S. Cl.
CPC ............... *G01J 3/2823* (2013.01); *G01J 3/42* (2013.01); *G01N 21/255* (2013.01); *G01N 21/55* (2013.01);
(Continued)

(58) Field of Classification Search
CPC ............. G01J 3/2823; G01J 2003/2826; G01J 2003/425; G06T 7/11; G06T 7/001;
(Continued)

(56) References Cited

U.S. PATENT DOCUMENTS

| 6,678,395 B2 | 1/2004 | Yanover et al. |
| 2011/0205536 A1* | 8/2011 | Johnsen ................ G01J 3/06 356/326 |
| 2016/0266246 A1 | 9/2016 | Hjelmstad |

FOREIGN PATENT DOCUMENTS

| JP | 2017-502258 A | 1/2017 |
| KR | 10-2014-0060746 A | 5/2014 |

(Continued)

OTHER PUBLICATIONS

Notice of Allowance for Korean Patent Application No. 10-2017-0138392, dated Apr. 19, 2018, including Verified English translation, 5pp.

(Continued)

*Primary Examiner* — Abdullahi Nur
(74) *Attorney, Agent, or Firm* — Lewis Roca Rothgerber Christie LLP (57) ABSTRACT

A method for detecting a shipwrecked vessel and drown victims by using an aerial hyperspectral image, according to the present invention, comprises the steps of: (a) allowing an image reception unit to receive an observed aerial hyperspectral image, check whether the received aerial hyperspectral image is suitable for detection analysis, and extract observation information, and location information and a (Continued)

reflectance value for each pixel with respect to the detected shipwrecked vessel and drown victims; (b) allowing an image analysis unit to analyze spectral characteristic similarity between a spectral reflection value of a target object and an observed reflection value by using pre-constructed spectral library information and extract constituent materials and an occupation ratio for each pixel of the hyperspectral image, thereby classifying a detection result; and (c) allowing an image visualization unit to display the received hyperspectral image, locations of the detected shipwrecked vessel and drown victims, and detailed information of the detection result.

9 Claims, 10 Drawing Sheets (51) Int. Cl.
| | |
|---|---|
| *G01N 21/25* | (2006.01) |
| *G01N 21/55* | (2014.01) |
| *G06K 9/00* | (2006.01) |
| *G06K 9/62* | (2006.01) |
| *G06T 7/00* | (2017.01) |
| *G06T 7/11* | (2017.01) |
| *G06K 9/32* | (2006.01) |
| *G06K 9/46* | (2006.01) |
| *G06T 17/05* | (2011.01) |

(52) U.S. Cl.
CPC ......... *G06K 9/0063* (2013.01); *G06K 9/3241* (2013.01); *G06K 9/46* (2013.01); *G06K 9/6215* (2013.01); *G06T 7/001* (2013.01); *G06T 7/0002* (2013.01); *G06T 7/11* (2017.01); *G06T 17/05* (2013.01); *G01J 2003/2826* (2013.01); *G01J 2003/425* (2013.01); *G06T 2207/10032* (2013.01); *G06T 2207/10036* (2013.01); *G06T 2207/30168* (2013.01); *G06T 2207/30196* (2013.01)

(58) Field of Classification Search
CPC .................. G06T 17/05; G06T 7/0002; G06T 2207/10032; G06T 2207/10036; G06T 2207/30168; G06T 2207/30196; G01N 21/55; G06K 9/6267; G06K 2009/00644; G06K 9/3241; G06K 9/46; G06K 9/0063; G06K 9/6215
See application file for complete search history.

(56) References Cited

FOREIGN PATENT DOCUMENTS

| | | |
|---|---|---|
| KR | 10-1414045 B1 | 7/2014 |
| KR | 10-2016-0049305 A | 5/2016 |
| KR | 10-1700144 B1 | 2/2017 |
| KR | 10-2017-0063182 A | 6/2017 |

OTHER PUBLICATIONS

Office action for Korean Patent Application No. 10-2017-0138392, dated Jan. 16, 2018, including Verified English translation, 17pp.
Verified English translation of allowed claims for Korean Patent Application No. 10-2017-0138392, dated May 14, 2019, 7pp.

* cited by examiner

[FIG. 1]

Marine accident scene

| No. | Ship | Material | Structure | Paint | No. | Ship | Material | Structure | Paint |
|---|---|---|---|---|---|---|---|---|---|
| 1 | Fishing Ship | FRP | deck | blue | 51 | Container Carrier | steel | deck | blue |
| 2 | Fishing Ship | FRP | deck | green | 52 | Container Carrier | steel | deck | green |
| 3 | Fishing Ship | FRP | deck | red | 53 | Container Carrier | steel | deck | red |
| 4 | Fishing Ship | FRP | deck | grey | 54 | Container Carrier | steel | deck | grey |
| 5 | Fishing Ship | FRP | deck | white | 55 | Container Carrier | steel | deck | white |
| 6 | Fishing Ship | FRP | deck | orange | 56 | Container Carrier | steel | deck | orange |
| 7 | Fishing Ship | FRP | side | blue | 57 | Container Carrier | steel | side | blue |
| 8 | Fishing Ship | FRP | side | green | 58 | Container Carrier | steel | side | green |
| 9 | Fishing Ship | FRP | side | red | 59 | Container Carrier | steel | side | red |
| 10 | Fishing Ship | FRP | superstructure | grey | 60 | Container Carrier | steel | superstructure | grey |
| 11 | Fishing Ship | FRP | superstructure | white | 61 | Container Carrier | steel | superstructure | white |
| 12 | Fishing Ship | FRP | funnel | grey | 62 | Container Carrier | steel | funnel | grey |
| 13 | Fishing Ship | FRP | funnel | white | 63 | Container Carrier | steel | funnel | white |
| 14 | Fishing Ship | wood | deck | blue | 64 | Ferry | steel | deck | blue |
| 15 | Fishing Ship | wood | deck | green | 65 | Ferry | steel | deck | green |
| 16 | Fishing Ship | wood | deck | red | 66 | Ferry | steel | deck | red |
| 17 | Fishing Ship | wood | deck | grey | 67 | Ferry | steel | deck | grey |
| 18 | Fishing Ship | wood | deck | white | 68 | Ferry | steel | deck | white |
| 19 | Fishing Ship | wood | deck | orange | 69 | Ferry | steel | deck | orange |
| 20 | Fishing Ship | wood | side | blue | 70 | Ferry | steel | side | blue |
| 21 | Fishing Ship | wood | side | green | 71 | Ferry | steel | side | green |
| 22 | Fishing Ship | wood | side | red | 72 | Ferry | steel | side | red |
| 23 | Fishing Ship | wood | superstructure | grey | 73 | Ferry | steel | superstructure | grey |
| 24 | Fishing Ship | wood | superstructure | white | 74 | Ferry | steel | superstructure | white |
| 25 | Fishing Ship | wood | funnel | grey | 75 | Ferry | steel | funnel | grey |
| 26 | Fishing Ship | wood | funnel | white | 76 | Ferry | steel | funnel | white |
| : | : | : | : | : | : | : | : | : | : |

```
Name:              Fishingship_FRP_deck_blue
First column:      X
Second column:     Y
Third column:      standard deviation
X units:           wavelength (nanometers)
Y units:           reflectance (percent)
First X value:     350
Last X value:      2500
Number of X Values: 2151
350  2.7734  0.0040
351  2.7675  0.0063
352  2.7467  0.0068
353  2.7286  0.0081
354  2.7132  0.0128
355  2.7039  0.0111
356  2.6947  0.0097
357  2.6823  0.0086
358  2.6641  0.0053
359  2.6440  0.0344
360  2.6429  0.0443
361  2.6280  0.0391
362  2.6107  0.0072
363  2.5984  0.0033
364  2.5910  0.0105
365  2.5828  0.0023
366  2.5792  0.0053
367  2.5630  0.0032
368  2.5489  0.0056
369  2.5440  0.0128
370  2.5333  0.0041
371  2.5183  0.0049
372  2.5060  0.0116
373  2.5062  0.0062
374  2.4964  0.0040
375  2.4940  0.0154
376  2.4845  0.0056
377  2.4832  0.0043
378  2.4743  0.0027
379  2.4653  0.0073
380  2.4595  0.0076
381  2.4523  0.0048
382  2.4464  0.0032
383  2.4446  0.0040
384  2.4372  0.0013
385  2.4328  0.0088
386  2.4272  0.0127
387  2.4219  0.0070
```

METHOD FOR DETECTING SHIPWRECKED VESSEL AND DROWN VICTIMS BY USING AERIAL HYPERSPECTRAL IMAGE

CROSS-REFERENCE TO RELATED APPLICATION(S)

This application is a National Phase Patent Application of International Patent Application Number PCT/KR2018/005719, filed on May 18, 2018, which claims priority of Korean Patent Application No. 10-2017-0138392, filed Oct. 24, 2017. The entire contents of both of which are incorporated herein by reference.

TECHNICAL FIELD

The present invention relates to a method for detecting disabled ships and persons overboard, and particularly to a method for detecting disabled ships and persons overboard by using hyperspectral images for improving identification ability that is optimized based on various subjects to be searched, and by improving the degree of distinction through reflected light spectral analysis test results of each subject, decreasing detection time and increasing the probability of detecting disabled ships and persons overboard caused by marine accidents, to support rapid search operations.

BACKGROUND ART

Currently, image analysis methods using hyperspectral images are being gradually proposed all over the world in the field of remote sensing technology using electro-optical images. Although approaches to such methods are being actively attempted in the fields of defense surveillance, geographic information and environmental surveillance, limited research is being carried out in the field of marine search platform (aircraft, ship) based image analysis.

Figure 1:
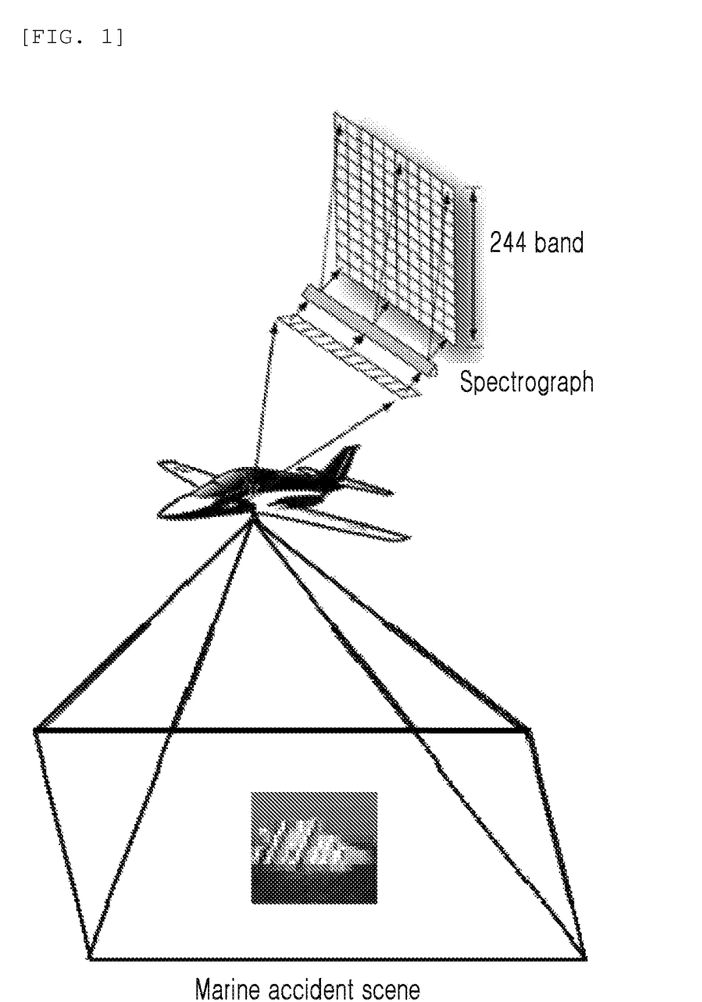
FIG. 1 is an exemplary configuration diagram of an image system for capturing images of an accident scene in 244 bands according to the wavelength of light, captured via an airborne hyperspectral image.

FIG. 1 is an exemplary configuration diagram of an image system for capturing images of an accident scene in 244 bands according to the wavelength of light, captured via an airborne hyperspectral image.

Figure 2:
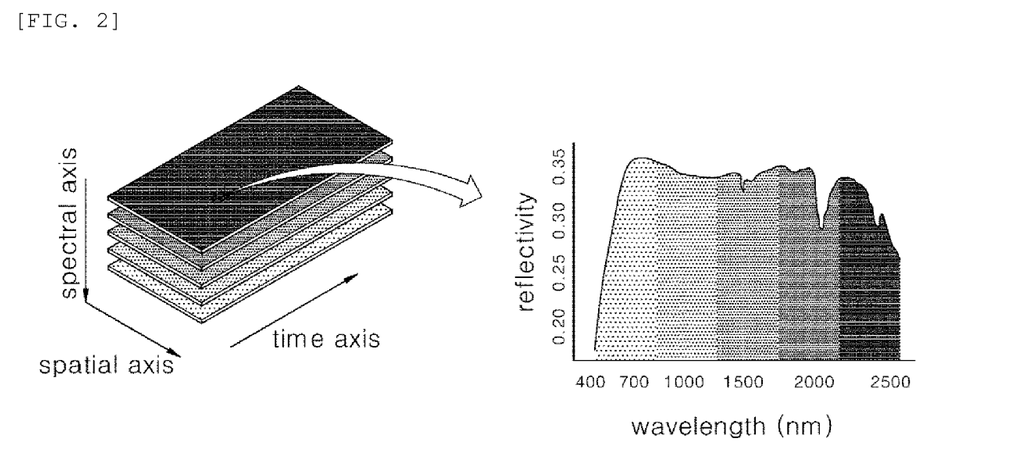
FIG. 2 is a graph illustrating spectral reflectance characteristics according to a wavelength of light (spectral axis) of an arbitrary pixel selected by coordinates of a spatial axis and a time axis in the hyperspectral image shown in FIG. 1.

FIG. 2 is a graph illustrating spectral reflectance characteristics according to a wavelength of light (spectral axis) of an arbitrary pixel selected by coordinates of a spatial axis and a time axis in the hyperspectral image shown in FIG. 1.

As shown in FIG. 1, a hyperspectral image is generally an image photographed in tens to hundreds of bands according to the wavelength of light. The hyperspectral image has high dimensional data composed of continuous bands having a wavelength width of about 10 nm in the wavelength range of 400 to 2500 nm.

Commonly used conventional image sensors capture multi-spectral images with only 3 to 10 bands having a large wavelength range of 100 to 200 nm. As shown in FIG. 2, since almost complete spectral characteristic curves can be obtained per pixel, it is possible to utilize spectral reflectance characteristics to detect distribution of specific materials, a target, a camouflaged body or the like, that are difficult to detect with existing multi-spectral images.

In the event of a marine accident, it is important to know the location of the disabled ship and the persons overboard accurately and quickly for rapid rescue and prevention of additional accidents.

In particular, since a marine accident requires a marine search to be carried out over a wide area including the range of drift movement, the development of a real-time analysis system based on an airborne image that allows quick observation of a wide sea area.

However, in the case of conventional technology based on general cameras or multi-spectral observation images, the reflectivity or morphological feature differences between a target material (ship body, overboard persons) and a background material (seawater) is used for target detection. Therefore, if the characteristics of the reflectivity within the observed band range are similar due to the color of the target material or the state of the sea, or if the size of the detected object is smaller than or similar to the spatial resolution of the image pixel which causes difficulties in morphological feature analysis, a problem arises wherein the target on sea is excluded from the detection.

In general, when a damaged or sinking ship or an overboard person due to a marine accident is detected, the pixel observation value of the subject to be detected is shown in a form wherein the spectral reflectivity of target materials as well as background materials (seawater) or moving objects (lifeboat, vest, etc.) are mixed. Therefore, when the conventional technology for detecting targets at sea based on multi-spectral images, the rate of missed detection is very high.

As a result, these problems can grow due to the decrease of spatial resolution and spectral sensitivity per pixel at the time of an aerial wide area observation. Any misses in detection in a marine accident search can cause fatal casualties.

Therefore, it is necessary to develop a detection system based on airborne hyperspectral images with a high detection rate and stability by utilizing spectral characteristics per pixel for quick and accurate detection and initial action.

The airborne observation hyperspectral sensor captures a surface area of a predetermined area corresponding to a predetermined spatial resolution per pixel.

Such observed surface area is represented by a quantitative sum of the reflected energies of a homogeneous single material or a mixture of two or more materials. The occupation ratio of each of the constituent materials within mixed pixels can be analyzed via a spectral mixture analysis.

In order to perform such a spectral mixture analysis, unique spectral reflectance characteristic information of each material is required. For this purpose, a single material pixel component is extracted from an image data to directly form an endmember and the spectral reflectance characteristic of the same is used, or a spectral library constructed via lab or field measurements is used.

There is an advantage in that when extracting directly from an image, it is possible to perform a spectral mixture analysis directly without prior information. However, if there is no pixel covered only with a single material, it is impossible to perform an accurate mixture analysis. There is a limit in that additional operations must be performed to confirm the material of the extracted end member.

On the other hand, when a spectral library is used, it is necessary to preliminarily construct a spectral library of the target materials, and it is necessary to take into consideration the difference in absolute values of spectral signals depending on weather and light conditions. However, it is possible to detect a target in an accurate and stable manner.

Therefore, the present inventors have found a method for detecting disabled ships and persons overboard based on airborne hyperspectral images, which is capable of finding characteristics for each subject to be searched, by considering the spectral characteristics of the subject to be searched when the difference between the subject to be searched and the surrounding environment is small and difficult to identify.

DETAILED DESCRIPTION OF THE INVENTION

Technical Problem

Therefore, the present invention is directed to providing a detection method for disabled ships and persons overboard based on airborne hyperspectral images which uses hyperspectral images in order to improve identification ability that is optimized based on various subjects to be searched, and improves the degree of distinction through reflected light spectral analysis test results of each subject to support rapid search operations.

Technical Solution

In order to accomplish the above object, a detection method for disabled ships and persons overboard based on airborne hyperspectral images of the present invention includes (a) receiving an observed airborne hyperspectral image and confirming whether the airborne hyperspectral image is suitable for detection analysis, and extracting observation information, location information and reflectivity value of each pixel of a detected disabled ship and overboard persons, via an image receiving unit; (b) analyzing a degree of similarity of spectral characteristics between spectral reflectivity value of a target material and an observed reflectivity value using pre-constructed spectral library information, and extracting a constituent material and occupation ratio for each pixel of the hyperspectral image to classify detected results via an image analyzing unit; and (c) displaying the received hyperspectral image, location of the detected disabled ship and persons overboard, and detailed information of the detected results, via an image visualization unit.

In order to accomplish the above object, step (a) of the detection method for disabled ships and persons overboard based on airborne hyperspectral images of the present invention includes, receiving the observed airborne hyperspectral image via an image receiving module; receiving the received hyperspectral image and confirming whether the observation information and image observed value is suitable for detection analysis by via an image conformance check module; and extracting the observation information, the location information and the reflectivity value of each pixel required for image analysis and visualization of detected results via an image preprocessing module.

In order to accomplish the above object, the observation information required for image analysis and visualization of detected results of the detection method for disabled ships and persons overboard based on airborne hyperspectral images of the present invention is spatial resolution and observation date and time.

In order to accomplish the above object, step (b) of the detection method for disabled ships and persons overboard based on airborne hyperspectral images of the present invention includes, fetching the spectral library information pre-constructed through field observations via a spectral library module; analyzing the degree of similarity of the spectral characteristics between the spectral reflectivity value of the target material and the observed reflectivity value using the spectral library information to extract the constituent material and occupation ratio for each pixel of the hyperspectral image via a spectral mixture analysis module; and classifying the detected results based on the constituent materials and occupation ratio extracted for each pixel and storing the detected results together with detailed information via a detected result classifying module.

In order to accomplish the above object, step (b) of the detection method for disabled ships and persons overboard based on airborne hyperspectral images of the present invention includes, measuring a degree of similarity between reference spectral reflection curves of target materials included in the spectral library and a reflection curve obtained from the hyperspectral image, to calculate the type and content of the constituent material for each pixel via the image analyzing unit.

In order to accomplish the above object, the degree of similarity of the detection method for disabled ships and persons overboard based on airborne hyperspectral images of the present invention is a degree of similarity between a subject spectrum and a reference spectrum calculated through a spectral angle measurement algorithm.

In order to accomplish the above object, step (c) of the detection method for disabled ships and persons overboard based on airborne hyperspectral images of the present invention includes, displaying and storing the received hyperspectral image in form of an image by selecting a predetermined band via a hyperspectral image visualization module; displaying and storing a location of a detected body in form of an image by distinguishing the detected disabled ship and persons overboard via a disabled ship and persons overboard location visualization module; and displaying and storing the detailed information including type, material, latitude and longitude by distinguishing according to classification of the detected results via a detected result detailed information displaying module.

In order to accomplish the above object, the spectral library of the detection method for disabled ships and persons overboard based on airborne hyperspectral images of the present invention is constructed by measuring spectral characteristic curves of constituent materials of a ship and a drifting body that are classified by material, paint, and color via a spectrometer.

In order to accomplish the above object, a detection method for disabled ships and persons overboard based on airborne hyperspectral images of the present invention includes (a) receiving an observed airborne hyperspectral image and confirming whether the airborne hyperspectral image is suitable for detection analysis, and extracting observation information, location information and reflectivity value of each pixel of a detected disabled ship and overboard persons, via an image receiving unit; (b) analyzing a degree of similarity of spectral characteristics between spectral reflectivity value of a target material and an observed reflectivity value using pre-constructed spectral library information, and extracting a constituent material and occupation ratio for each pixel of the hyperspectral image to classify detected results via an image analyzing unit; and (c) displaying the received hyperspectral image, location of the detected disabled ship and persons overboard, and detailed information of the detected results, via an image visualization unit; wherein if the extracted constituent material within each pixel is multi-mixed, a spectral characteristic curve that is completed based on the hyperspectral image is used to extract the constituent material and occupation ratio of each pixel which enables detection in pixel units or less.

Specific details of other embodiments are included in the "Modes for carrying out the Invention" and "Drawing" attached.

The advantages and/or features of the present invention and the manner of achieving them will be apparent by reference to various embodiments described in detail below with reference to the accompanying drawings.

However, the present invention is not limited to the configurations of the embodiments described below, but may be embodied in various other forms, and each embodiment disclosed in this specification is intended to be illustrative only. It will be understood by those of ordinary skill in the art that various changes in form and details may be made therein without departing from the spirit and scope of the invention as defined by the appended claims.

Advantageous Effects

According to the present invention, it is possible to reduce the detection time of disabled ships and missing persons caused by marine accidents, and increase the detection probability, to support rapid search operations.

In addition, detection probabilities can be improved to more than 90% and false alarm rates less than 10% can be achieved by applying a hyperspectral image detection algorithm specific to a search subject.

Further, the present invention utilized as a core technology in the field of surveillance of military defense and illegal fishing vessels, which is rapidly increasing in demand in recent years, enables establishing a base for localization and advancement of the whole marine search equipment industry which is in constant demand.

DESCRIPTION OF THE DRAWINGS

FIG. 8 is a screen illustrating an embodiment of a spectral library list and detailed information per material used in the method for detecting disabled ships and persons overboard illustrated in FIG. 4.

BEST MODE FOR CARRYING OUT THE INVENTION

Hereinafter, preferred embodiments of the present invention will be described in detail with reference to the accompanying drawings.

Before describing the present invention in detail, terms and words used herein should not be construed as being unconditionally limited in a conventional or dictionary sense, and the inventor of the present invention can define and use concepts of various terms appropriately as needed in order to explain the present invention in the best way.

Furthermore, it should be understood that these terms and words are to be construed in light of the meanings and concepts consistent with the technical idea of the present invention.

In other words, the terminology used herein is for the purpose of describing preferred embodiments of the present invention, and is not intended to specifically limit the content of the present invention.

It should be understood that these terms are defined terms in view of the various possibilities of the present invention.

Further, in this specification, the singular forms "a", "an," and "the" include plural referents unless the context clearly dictates otherwise.

Also, it should be understood that the present invention can include a single meaning even if it is similarly expressed in plural.

Where a component is referred to as "comprising" another component throughout this specification, unless specified otherwise, this means the component does not exclude any other element but may further include any other element.

Further, when it is stated that an element is "inside or connected to another element", this element may be directly connected to another element or may be installed in contact with it, or may be installed spaced apart with a predetermined distance, and in the case where a component is installed to be spaced apart with a predetermined distance, a third component or means for fixing or connecting the component to another component may be present, and it should be noted that the description of the third component or means may be omitted.

On the other hand, it should be understood that there is no third component or means when an element is described as being "directly coupled" or "directly connected" to another element.

Likewise, other expressions that describe the relationship between the components, such as "between" and "right between ~", or "neighboring to" and "directly adjacent to" and such should be understood in the same spirit.

Further, in this specification, when terms such as "one surface", "other surface", "one side", "other side", "first", "second" and such are used, it is to clearly distinguish one component from another.

It should be understood, however that the meaning of the component is not limited by such term.

It is also to be understood that terms related to positions such as "top", "bottom", "left", "right" in this specification are used to indicate relative positions in the drawings for the respective components.

Further, unless an absolute position is specified for these positions, it should not be understood that these position-related terms refer to absolute positions.

Furthermore, in the specification of the present invention, the terms "part", "unit", "module", "device" and the like mean a unit capable of handling one or more functions or operations.

These may be implemented as hardware or software, or a combination of hardware and software.

It is to be understood that the size, position, coupling relationships and such, of each component constituting the present invention in the accompanying drawings, may be partially exaggerated or reduced or omitted to be able to sufficiently clearly convey the scope of the invention or for convenience of describing, and therefore the proportion or scale thereof may not be rigorous.

Also, in the following description of the present invention, a detailed description of a configuration that is considered to unnecessarily obscure the gist of the present invention, for example, a known technology including the prior art, may be omitted.

Figure 3:
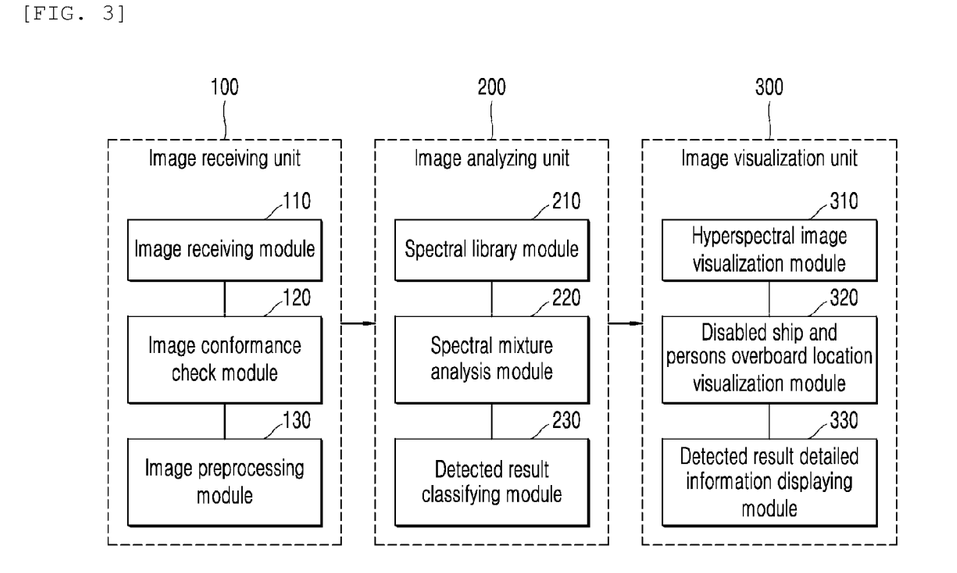
FIG. 3 is a block diagram of a system for implementing a method for detecting disabled ships and persons overboard according to the present invention.

FIG. 3 is a block diagram of a system for implementing a method for detecting disabled ships and persons overboard according to the present invention, which provides an image receiving unit 100, an image analyzing unit 200, and an image visualization unit 300.

The image receiving unit 100 includes an image receiving module 110, an image conformance check module 120, and an image preprocessing module 130. The image analyzing unit 200 includes a spectral library module 210 and a spectral mixture analysis module 220. The image visualization unit 300 includes a hyperspectral image visualization module 310, a disabled ship and persons overboard location visualization module 320, and a detected result detailed information displaying module 330.

Figure 4:
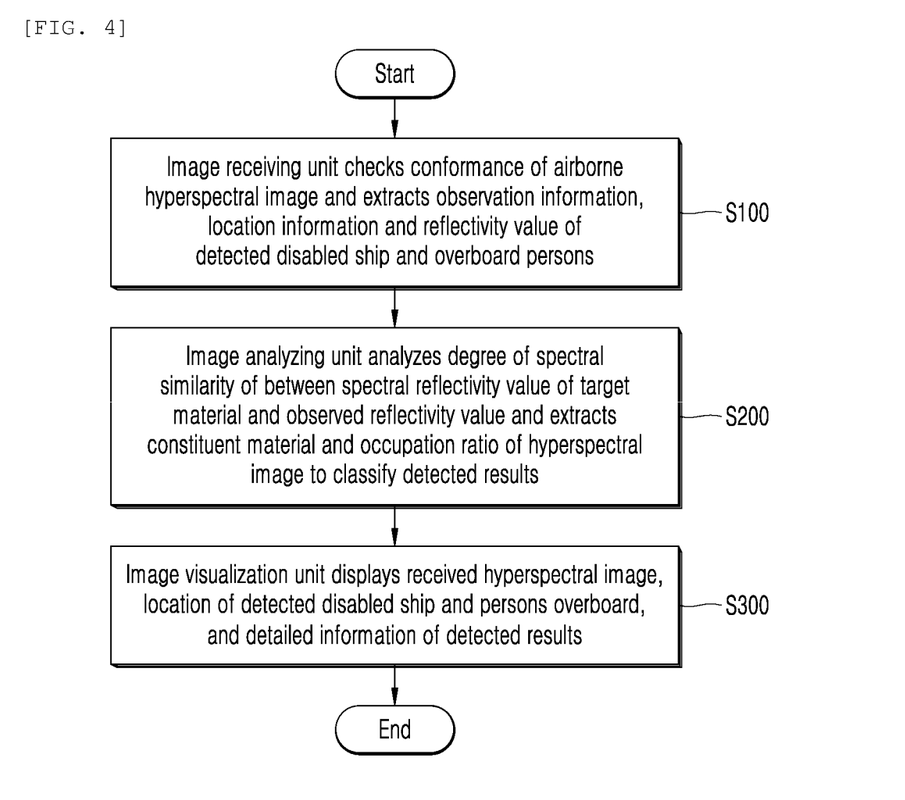
FIG. 4 is a flowchart illustrating the operations of a method for detecting disabled ships and persons overboard according to the present invention.

FIG. 4 is a flowchart illustrating the operations of a method for detecting disabled ships and persons overboard according to the present invention.

Referring to FIGS. 1 to 4, the schematic operations of a method for detecting disabled ships and persons overboard according to the present invention are described as follows.

First, the image receiving unit 100 receives an observed airborne hyperspectral image and confirms whether the airborne hyperspectral image is suitable for detection analysis, and extracts observation information, location information and reflectivity value of each pixel of a detected disabled ship and overboard persons in step S100.

The image analyzing unit 200 analyzes a degree of similarity of spectral characteristics between spectral reflectivity value of a target material and an observed reflectivity value using pre-constructed spectral library information, and extracts a constituent material and occupation ratio for each pixel of the hyperspectral image to classify detected results in step S200.

The image visualization unit 300 displays the received hyperspectral image, location of the detected disabled ship and persons overboard, and detailed information of the detected results in step S300.

Detailed descriptions of the operations of the method for detecting disabled ships and persons overboard according to the present invention will be described later.

Figure 5:
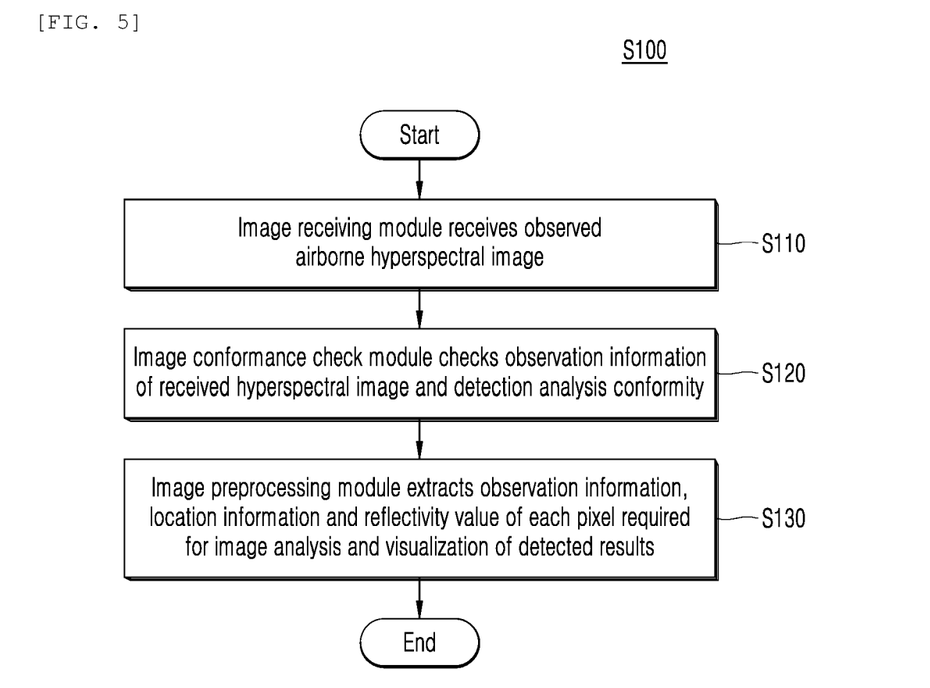
FIG. 5 is a flowchart illustrating a partial operation of step S100 in the method for detecting disabled ships and persons overboard illustrated in FIG. 4.

FIG. 5 is a flowchart illustrating a partial operation of step S100 in the method for detecting disabled ships and persons overboard illustrated in FIG. 4.

Referring to FIGS. 1 to 5, the schematic description of partial operations of step S100 in the method for detecting disabled ships and persons overboard according to the present invention is as follows.

First, the image receiving module 110 receives the observed airborne hyperspectral image in step S110.

The image conformance check module 120 receives the received hyperspectral image and confirms whether the observation information and image observed value is suitable for detection analysis in step S120.

The image preprocessing module 130 extracts the observation information, the location information and the reflectivity value of each pixel required for image analysis and visualization of detected results in step S130.

Detailed descriptions of the operations of step S100 of the method for detecting disabled ships and persons overboard according to the present invention will be described later.

Figure 6:
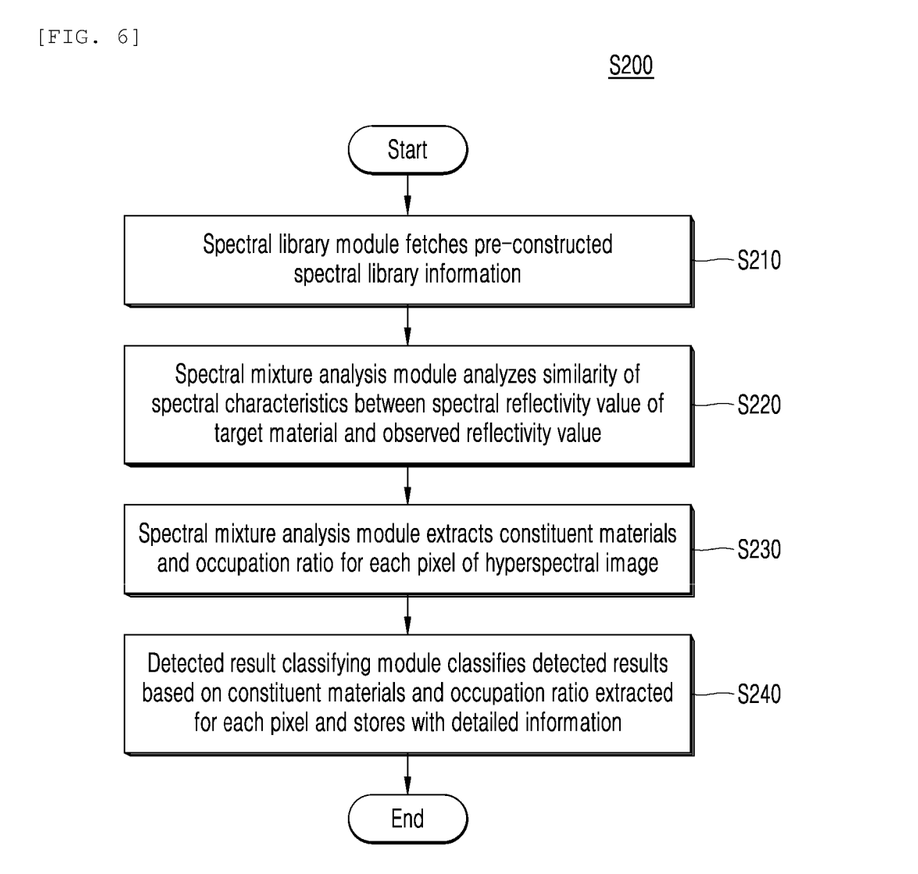
FIG. 6 is a flowchart illustrating a partial operation of step S200 in the method for detecting disabled ships and persons overboard illustrated in FIG. 4.

FIG. 6 is a flowchart illustrating a partial operation of step S200 in the method for detecting disabled ships and persons overboard illustrated in FIG. 4.

Referring to FIGS. 1 to 6, the schematic description of partial operations of step S200 in the method for detecting disabled ships and persons overboard according to the present invention is as follows.

The spectral library module 210 fetches the spectral library information pre-constructed through field observations in step S210.

The spectral mixture analysis module 220 analyzes the degree of similarity of the spectral characteristics between the spectral reflectivity value of the target material and the observed reflectivity value using the spectral library information to extract the constituent material and occupation ratio for each pixel of the hyperspectral image in step S220.

The detected result classifying module 230 classifies the detected results based on the constituent materials and occupation ratio extracted for each pixel and stores the detected results together with detailed information in step S230.

Detailed descriptions of the operations of step S200 of the method for detecting disabled ships and persons overboard according to the present invention will be described later.

Figure 7:
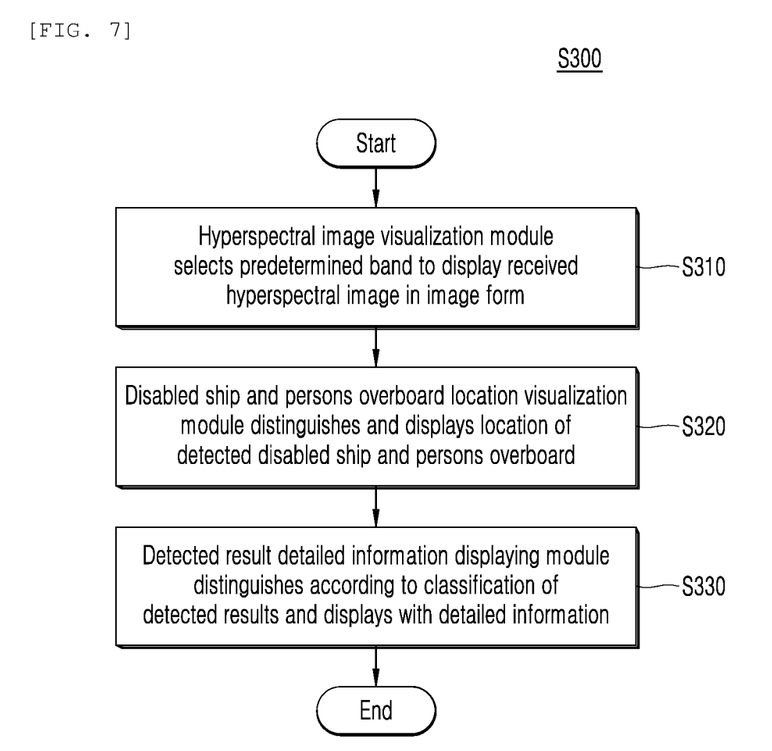
FIG. 7 is a flowchart illustrating a partial operation of step S300 in the method for detecting disabled ships and persons overboard illustrated in FIG. 4.

FIG. 7 is a flowchart illustrating a partial operation of step S300 in the method for detecting disabled ships and persons overboard illustrated in FIG. 4.

Referring to FIGS. 1 to 7, the schematic description of partial operations of step S300 in the method for detecting disabled ships and persons overboard according to the present invention is as follows.

First, the hyperspectral image visualization module 310 displays and stores the received hyperspectral image in form of an image by selecting a predetermined band in step S310.

The disabled ship and persons overboard location visualization module 320 displays and stores a location of a detected body in form of an image by distinguishing the detected disabled ship and persons overboard in step S320.

The detected result detailed information displaying module 330 displays and stores the detailed information including type, material, latitude and longitude by distinguishing according to classification of the detected results in step S330.

Detailed descriptions of the operations of step S300 of the method for detecting disabled ships and persons overboard according to the present invention will be described later.

FIG. 8 is a screen illustrating an embodiment of a spectral library list and detailed information per material used in the method for detecting disabled ships and persons overboard illustrated in FIG. 4.

Figure 9:
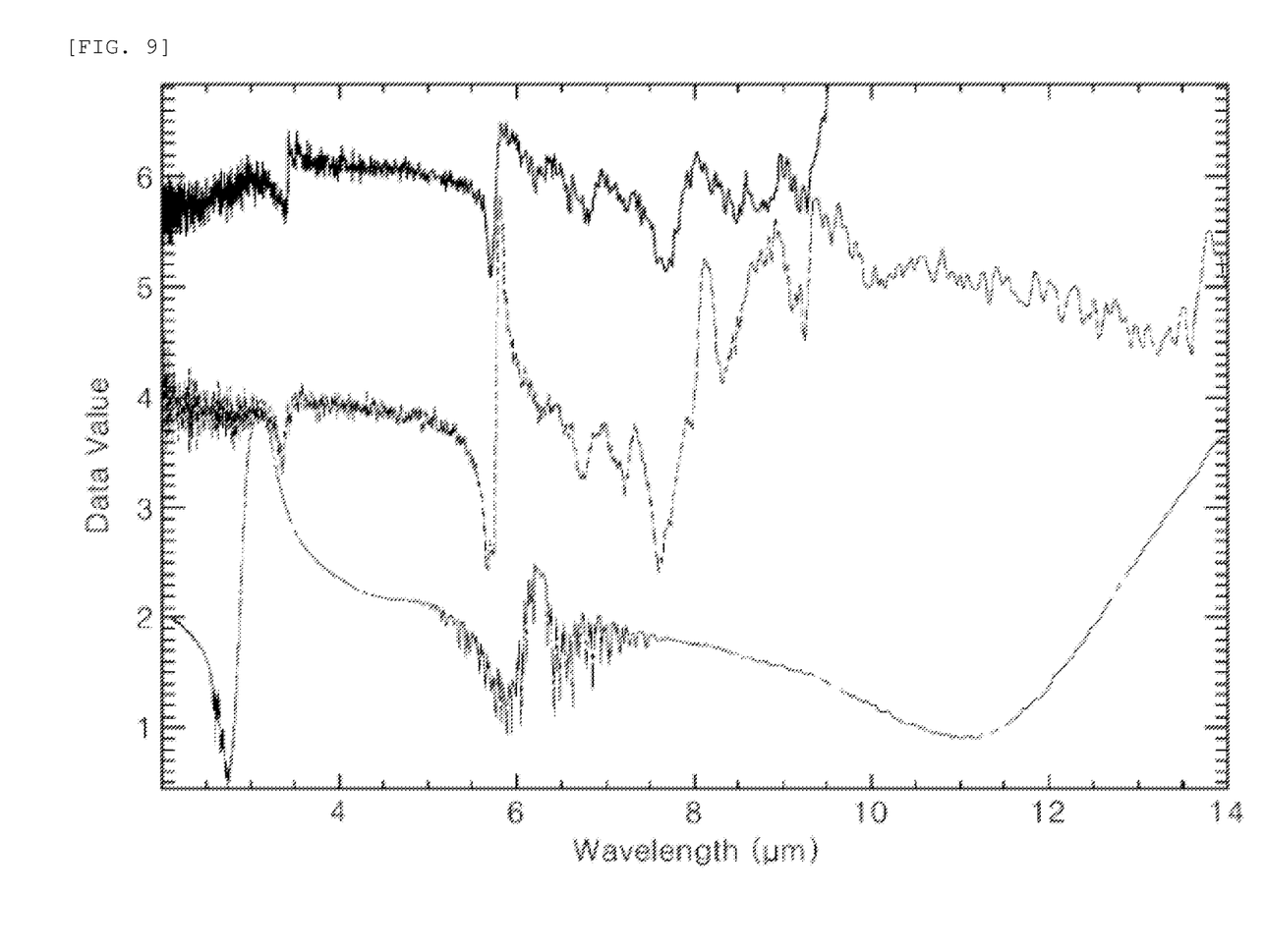
FIG. 9 is a graph of an embodiment of a spectral distribution per material used in the method for detecting disabled ships and persons overboard illustrated in FIG. 4.

FIG. 9 is a graph of an embodiment of a spectral distribution per material used in the method for detecting disabled ships and persons overboard illustrated in FIG. 4.

Figure 10:
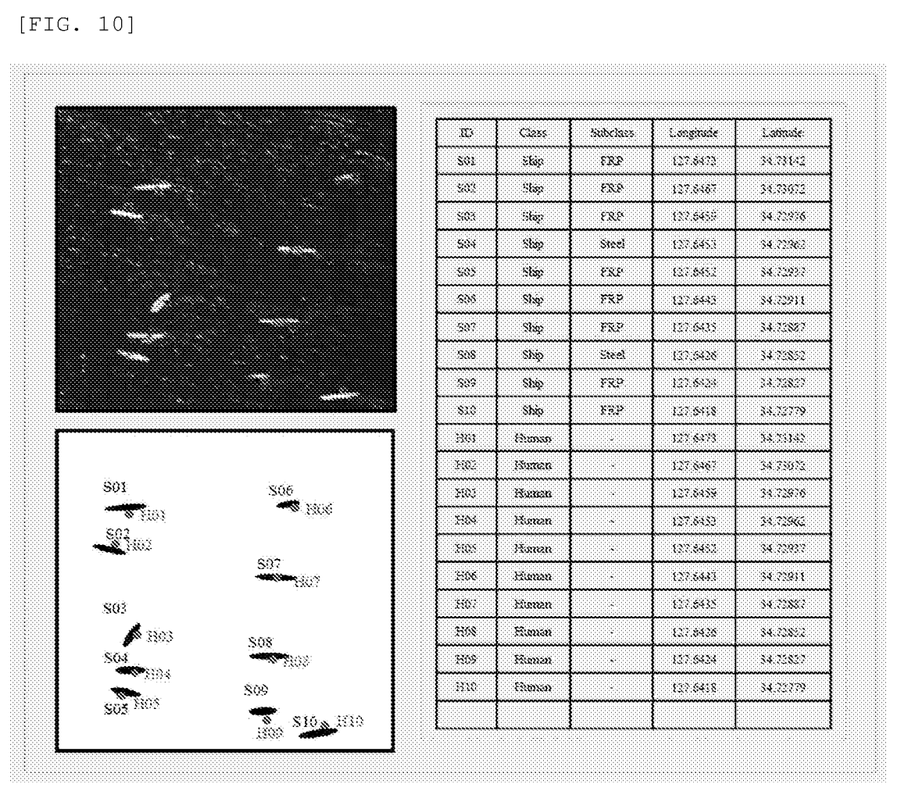
FIG. 10 is a screen illustrating an embodiment of detected results for a disabled ship and overboard persons displayed via an image visualization unit 300 shown in FIG. 3.

FIG. 10 is a screen illustrating an embodiment of detected results for a disabled ship and overboard persons displayed via an image visualization unit 300 shown in FIG. 3.

Referring to FIGS. 1 to 10, the detailed description of operations of the method for detecting disabled ships and persons overboard according to the present invention is as follows.

After the preprocessing process is performed in the image receiving unit 100, the image analyzing unit 200 performs a spectral mixture analysis based on the spectral library and classifies the detected results into corresponding types.

That is, when the image receiving unit 100 receives the observed airborne hyperspectral image in the image receiving module 110, the image conformance check module 120 determines whether the observation information and the image observation values are normal and are suitable for the detection analysis.

Further, the image preprocessing module 130 extracts the observation information (spatial resolution, observation date and time) and location information and reflectivity value of each pixel required for image analysis and visualization of detected results.

Meanwhile, when the image analyzing unit 200 fetches the spectral library information pre-constructed through field observations in the spectral library module 210, the spectral mixture analysis module 220 analyzes a degree of similarity of spectral characteristics between spectral reflectivity value of a target material and an observed reflectivity value to extract a constituent material and occupation ratio for each pixel of the hyperspectral image.

Further, the detected result classifying module 230 classifies the detected results based on the constituent materials and occupation ratio extracted for each pixel and stores the detected results together with detailed information.

As shown in FIG. 6, in the present invention, instead of using an image end member extraction method well known in the arts, the present invention uses a spectral library constructed by directly measuring spectral characteristic curves of constituent materials of ships and drifting bodies classified by material, paint, and color by using a spectrometer, for accurate and stable detection.

That is, by using a spectral library, detected results can be automatically classified into classifications of ship/overboard persons, type of ship and etc., without additional operations. Also, it is possible to instantly and efficiently display the results in accordance to the purpose of the rapid search via a visualization module.

The type and content of the constituent material for each pixel are calculated by measuring the degree of similarity of the reference spectral reflection curves of the target materials contained in the spectral library and the reflection curve obtained from the hyperspectral image.

To this end, in the present invention, the degree of similarity between the subject spectrum (t) and the reference spectrum (r) is determined through a spectral angle measurement algorithm.

Assuming each spectral reflection curve as a vector when measured in n bands, the angle ($\alpha$) between these two vectors is defined as a spectral angle using the following Equation 1.

$$\alpha = \arccos\left[\frac{\sum_{i=1}^{n} t_i r_i}{\sqrt{\sum_{i=1}^{n} t_i^2} \sqrt{\sum_{i=1}^{n} r_i^2}}\right]$$ [Equation 1]

Here, $t_i$ is a subject spectrum, $r_i$ is a reference spectrum, and n represents the number of bands.

At this time, it is determined that the smaller the angle ($\alpha$) between two vectors, the more similar the two spectrums are.

The spectral angle algorithm is suitable for use in a rapid search based on a spectral library since its calculation rate is fast and is not affected by the length of the vector, i.e., the absolute value of reflectivity.

Further, unlike conventional multi-spectral image-based maritime target detection techniques where the range of detectability is greatly limited by the spatial resolution and object size when multiple substances in a pixel are mixed by using simple reflectivity or morphological characteristics, in the present invention, it is possible to detect in pixel units or less by extracting the constituent material and the occupation ratio of each pixel by using the spectral characteristic curve completed based on hyperspectral images.

Meanwhile, the result detected in the image receiving unit 100 is displayed via the image visualization unit 300 in a final form of a user-friendly graphical user interface (GUI).

That is, the hyperspectral image visualization module 310 of the image visualization unit 300 displays and stores the input airborne hyperspectral image in form of an image by selecting a specific band (for example, RGB). Then, the disabled ship and persons overboard location visualization module 320 displays and stores a location of a detected body in form of an image by distinguishing the detected disabled ship and persons overboard.

Further, the detected result detailed information displaying module 330 displays and stores the detailed information including type, material, latitude and longitude by distinguishing according to classification of the detected results in form of a table.

As shown in FIG. 10, the observed airborne hyperspectral image that has undergone the preprocessing process in the image receiving unit 100 and the detected bodies to be detected in the corresponding area are displayed in real time in image form and detailed information is displayed together with in text form.

The present invention overcomes the limits of marine target detection of conventional technology through application of methods of analyzing spectral mixture per pixel using a spectral library, and it is possible to provide a more accurate and stable detected results instantly without any additional operations.

As mentioned, the method for detecting disabled ships and persons overboard by using hyperspectral images of the present invention uses hyperspectral images for improving identification ability that is optimized based on various subjects to be searched, and improves the degree of distinction through reflected light spectral analysis test results of each subject and can support rapid search operations of disabled ships and persons overboard caused by marine accidents.

Through this, detection time is decreased and the probability of detecting disabled ships and persons overboard caused by marine accidents increases, to support rapid search operations.

In addition, detection probabilities can be improved to more than 90% and false alarm rates less than 10% can be achieved by applying a hyperspectral image detection algorithm specific to a search subject.

Further, the present invention utilized as a core technology in the field of surveillance of military defense and illegal fishing vessels, which is rapidly increasing in demand in recent years, enables establishing a base for localization and advancement of the whole marine search equipment industry which is in constant demand.

Although a specific embodiment of the present invention has been described so far, the description of various embodiments described in the "Best Mode for carrying out the Invention" is merely illustrative, and it is apparent that various modifications can be made without departing from the scope of the present invention.

In addition, since the present invention can be embodied in various other forms, the present invention is not limited by the above description, and the above description is intended to provide a thorough understanding of the present invention. It will be understood by those of ordinary skill in the art that the present invention is only provided to fully inform the person skilled in the art of the scope of the present invention and the present disclosure will only be defined by the appended claims.

The invention claimed is:

1. A detection method for disabled ships and persons overboard based on airborne hyperspectral images comprising,
   a) receiving an observed airborne hyperspectral image and confirming whether the airborne hyperspectral image is suitable for detection analysis, and extracting observation information, location information and reflectivity value of each pixel of a detected disabled ship and overboard persons, via an image receiving unit;
   (b) analyzing a degree of similarity of spectral characteristics between spectral reflectivity value of a target material and an observed reflectivity value using pre-constructed spectral library information, and extracting a constituent material and occupation ratio for each pixel of the hyperspectral image to classify detected results via an image analyzing unit; and
   (c) displaying the received hyperspectral image, location of the detected disabled ship and persons overboard, and detailed information of the detected results, via an image visualization unit,
   wherein said step (b) comprises,
   measuring a degree of similarity between reference spectral reflection curves of target materials included in the spectral library and a reflection curve obtained from the hyperspectral image, and
   in a case where the obtained reflection curve is measured in a plurality of bands,
   the plurality of bands are assumed as vectors, and the degree of similarity is measured through a spectral angle measurement algorithm that defines an angle between each respective vector of the reference spectral reflection curves and a vector of the obtained reflection curve as a spectral angle.

2. The method of claim 1, wherein said step (a) comprises,
   receiving the observed airborne hyperspectral image via an image receiving module;
   receiving the received hyperspectral image and confirming whether the observation information and image observed value is suitable for detection analysis by via an image conformance check module; and
   extracting the observation information, the location information and the reflectivity value of each pixel required for image analysis and visualization of detected results via an image preprocessing module.

3. The method of claim 2, wherein the observation information required for image analysis and visualization of detected results is spatial resolution and observation date and time.

4. The method of claim 1, wherein said step (b) comprises,
   fetching the spectral library information pre-constructed through field observations via a spectral library module;
   analyzing the degree of similarity of the spectral characteristics between the spectral reflectivity value of the target material and the observed reflectivity value using the spectral library information to extract the constituent material
   and occupation ratio for each pixel of the hyperspectral image via a spectral mixture analysis module; and
   classifying the detected results based on the constituent materials and occupation ratio extracted for each pixel and storing the detected results together with detailed information via a detected result classifying module.

5. The method of claim 1, wherein in said step (b)
   the image analyzing unit measures the degree of similarity to calculate the type and content of the constituent material for each pixel.

6. The method of claim 5, wherein the degree of similarity is a degree of similarity between a subject spectrum and a reference spectrum calculated through the spectral angle measurement algorithm.

7. The method of claim 1, wherein said step (c) comprises,
   displaying and storing the received hyperspectral image in form of an image by selecting a predetermined band via a hyperspectral image visualization module;
   displaying and storing a location of a detected body in form of an image by distinguishing the detected disabled ship and persons overboard via a disabled ship and persons overboard location visualization module; and
   displaying and storing the detailed information including type, material, latitude and longitude by distinguishing according to classification of the detected results via a detected result detailed information displaying module.

8. The method of claim 1, wherein the spectral library is constructed by measuring spectral characteristic curves of constituent materials of a ship and a drifting body that are classified by material, paint, and color via a spectrometer.

9. A detection method for disabled ships and persons overboard based on airborne hyperspectral images comprising,
   (a) receiving an observed airborne hyperspectral image and confirming whether the airborne hyperspectral image is suitable for detection analysis, and extracting observation information, location information and reflectivity value of each pixel of a detected disabled ship and overboard persons, via an image receiving unit;
   (b) analyzing a degree of similarity of spectral characteristics between spectral reflectivity value of a target material and an observed reflectivity value using pre-constructed spectral library information, and extracting a constituent material and occupation ratio for each pixel of the hyperspectral image to classify detected results via an image analyzing unit; and
   (c) displaying the received hyperspectral image, location of the detected disabled ship and persons overboard, and detailed information of the detected results, via an image visualization unit;
   wherein said step (b) comprises, measuring a degree of similarity between reference spectral reflection curves of target materials included in the spectral library and a reflection curve obtained from the hyperspectral image, and in a case where the obtained reflection curve is measured in a plurality of bands, the plurality of bands are assumed as vectors, and the degree of similarity is measured through a spectral angle measurement algorithm that defines an angle between each respective vector of the reference spectral reflection curves and a vector of the obtained reflection curve as a spectral angle, and if the extracted constituent material within each pixel is multi-mixed, a spectral characteristic curve that is completed based on the hyperspectral image is used to extract the constituent material and occupation ratio of each pixel which enables detection in pixel units or less.

\* \* \* \* \*